United States Patent [19]
Kim et al.

[11] Patent Number: 6,001,326
[45] Date of Patent: Dec. 14, 1999

[54] METHOD FOR PRODUCTION OF MONO-DISPERSED AND CRYSTALLINE TIO₂ULTRAFINE POWDERS FOR AQUEOUS TIOCL₂SOLUTION USING HOMOGENEOUS PRECIPITATION

[75] Inventors: Sun-Jae Kim; Soon Dong Park; Kyeong Ho Kim; Yong Hwan Jeong; Il Hiun Kuk, all of Taejon-ku, Rep. of Korea

[73] Assignee: Korea Atomic Energy Research Institute, Taejon, Rep. of Korea

[21] Appl. No.: 09/162,009

[22] Filed: Sep. 28, 1998

[30] Foreign Application Priority Data

Jul. 16, 1998 [KR] Rep. of Korea ............... 98-28928

[51] Int. Cl.⁶ .............. C01G 25/02; C01G 23/047
[52] U.S. Cl. .................. 423/598; 423/608; 423/611; 423/612
[58] Field of Search .................. 423/598, 608, 423/610, 611, 612

[56] References Cited

U.S. PATENT DOCUMENTS

| | | | |
|---|---|---|---|
| 2,832,731 | 4/1958 | Cunningham | 204/64 |
| 3,846,527 | 11/1974 | Winter et al. | 264/63 |
| 3,923,968 | 12/1975 | Basque et al. | 423/611 |
| 4,002,574 | 1/1977 | Wade | 252/188 |
| 4,012,338 | 3/1977 | Urwin | 252/461 |
| 4,842,832 | 6/1989 | Inoue et al. | 423/211 |
| 4,923,682 | 5/1990 | Roberts et al. | 423/611 |
| 4,944,936 | 7/1990 | Lawhorne | 423/612 |
| 5,030,439 | 7/1991 | Brownbridge . | |
| 5,068,056 | 11/1991 | Robb | 252/313.1 |
| 5,075,206 | 12/1991 | Noda et al. | 430/531 |
| 5,173,397 | 12/1992 | Noda et al. | 430/531 |
| 5,443,811 | 8/1995 | Karvinen . | |
| 5,821,186 | 10/1998 | Collins | 502/8 |

OTHER PUBLICATIONS

Kim et al. Preparation of mono–dispersed ultrafine TiO2 crystalline powders by homogeneous spontaneous precipitation from aqueous TiOCl2 solution. Yoop Hakhoechi, 35 (11), 1212–1221 (Korean) . Korean ceramic Society, 1998.

Nam et al. Preparation of ultrafine crystalline TiO2 powders from aqueous TiCl4 solution by precipitation. Jpn. J. Appl. Phs., Part 1, 37 (8), 4603–4608 (English). Japanese Journal of Applied Physics, 1998.

Kim et al. Preparation of crystalline TiO2 ultrafine powders from aqueous TiCl4 solution by precipitation method. Yoop Hakhoechi, 35 (4), 325–332 (Korean). Korean Ceramic Society, 1998.

*Primary Examiner*—Gary P. Straub
*Assistant Examiner*—Cam N. Nguyen
*Attorney, Agent, or Firm*—Bachman & LaPointe, P.C.

[57] ABSTRACT

A method for production of mono-dispersed and crystalline titanium dioxide ultra fine powders comprises preparing an aqueous titanyl chloride solution, diluting the aqueous titanyl chloride solution to a concentration of between about 0.2 to 1.2 mole and heating the diluted aqueous titanyl chloride solution and maintaining the solution in a temperature range of between 15 to 155° C. to precipitate titanium dioxide. The aqueous titanyl chloride solution is prepared by adding ice pieces of distilled water or icing distilled water to undiluted titanium tetrachloride.

12 Claims, 4 Drawing Sheets

METHOD FOR PRODUCTION OF MONO-DISPERSED AND CRYSTALLINE $TIO_2$ ULTRAFINE POWDERS FOR AQUEOUS $TIOCL_2$ SOLUTION USING HOMOGENEOUS PRECIPITATION

FIELD OF THE INVENTION

The present invention relates to a method for production of mono-dispersed and crystalline titanium dioxide ($TiO_2$) ultrafine powders. In particular, the present invention relates to a method for production of mono-dispersed and crystalline titanium dioxide ultrafine powders, which comprises (a) step of preparing aqueous titanyl chloride ($TiOCl_2$) solution in a concentration of greater than or equal to 1.5M, by adding ice pieces of distilled water or icy distilled water to the undiluted titanium tetrachloride ($TiCl_4$); (b) step of diluting the above aqueous titanyl chloride solution to a specific concentration by adding an adequate amount of distilled water; (c) step of obtaining titanium dioxide precipitates by heating the above diluted aqueous titanyl chloride solution and maintaining the temperature within a range of 15–155° C.; and (d) step of fabricating the mono-dispersed and crystalline titanium dioxide ultrafine powders by filtrating, washing and drying the above titanium dioxide precipitates.

BACKGROUND OF THE INVENTION

Titanium dioxide, which is usually used as photocatalyst removing environmental pollutants, pigment materials, additives for plastic product or optical multi-coating reagent, has two phases of crystalline structure, that is anatase and rutile. Titanium dioxide with anatase phase has been used as a photocatalyst for photodecomposition of acetone, phenol or trichloro ethylene, oxidation system of nitric oxide such as nitrogen mono-oxide and nitrogen dioxide and conversion system of solar energy because of its high photo-activity. Titanium dioxide with rutile phase has been widely used for white pigment materials because of its good scattering effect that protects the ultraviolet light. It has also been used for optical coating, beam splitter and anti-reflection coating since it has a high dielectric constant and refractive index, a good oil adsorption ability and tinting power, and chemical stability, even under strongly acidic or basic conditions. Titanium dioxide shows different electrical characteristics according to oxygen partial pressure since it has wide chemical stability and non-stoichiometric phase region. Because of this, it can also be used for a humidity sensor and a high-temperature oxygen sensor, and the field of its use has become wide.

Generally, titanium dioxide powders are fabricated by a chloride process, which is a gas phase process, or by a sulfate process, which is a liquid phase process.

In the chloride process, which was industrialized by Du Pont in USA in 1956, titanium tetrachloride, vigorously reacting with moisture in the air and undergoing hydrolysis, is used as a starting material and the reaction temperature needs to be higher than 1,000° C. Also, this method requires extra protection devices because of the corrosive HCl or $Cl_2$ gas by-produced in the process, leading to higher production costs. Because titanium dioxide powders produced by the chloride process are fine but rough, additive equipment for giving external electric fields or controlling reactant mixing ratios are required to control the particle shape and the particle size of titanium dioxide powders.

In the sulfate process, which was industrialized by Titan company in Norway in 1916, titanium sulfate ($TiSO_4$) is conventionally hydrolyzed at temperatures higher than 95° C., calcined at 800–1,000° C. and then pulverized to produce titanium dioxide powders. During these calcination and pulverization processes, impurities are introduced causing the quality of the final titanium dioxide powder to be low.

However, compared with gas phase process, the liquid phase process represented by the sulfate process needs a milder temperature condition and makes it possible to produce titanium dioxide in a large amount, thus there have been some other reports about an improved liquid phase process or new liquid phase process to fabricate crystalline titanium dioxide powder using titanium tetrachloride, the starting material in the chloride process.

Russia patent SU-1,398,321 shows a new liquid phase process, in which an adequate amount of anatase phase titaniferous seed was added into titanium tetrachloride solution, hydrolyzed to precipitate titanium dioxide powders by heating and the precipitated titanium dioxide was fabricated by an additional process such as a high temperature treatment. This process is simple but requires additive high temperature treatment of 600–650° C. to obtain anatase phase titanium dioxide, and a much higher temperature treatment to obtain rutile phase titanium dioxide.

In addition, in JP 9-124,320, gel was formed by adding water to titanium tetrachloride dissolved in alcohol such as butanol, together with one of various kinds of acetate, carbonate, oxalate and citrate containing alkali metals or alkali earth metals. Then, the obtained gel was treated with high temperature and titanium dioxide was fabricated. The physical properties of titanium dioxide powders produced by this method are good, but the process requires expensive additives such as organic acids and needs a high temperature treatment to remove added organic acids after gel formation.

Another process like sol-gel method and hydrothermal synthesis has been developed to control the titanium dioxide powder characteristics such as particle shape, particle size and distribution of the particle size. Metal alkoxide is usually used to fabricate spherically shaped titanium dioxide powders with a uniform size on a laboratory scale and this sol-gel method using alkoxide produces fine spherically shaped powders with a uniform, size smaller than 1.0 $\mu$m. However, tight control of the reaction conditions is required since alkoxide is intensely hydrolyzed in air. Furthermore, the high price of the alkoxide limits its commercialization. The hydrothermal synthesis using an autoclave under high temperature and pressure conditions produces high quality powders but a continuous process has been impossible up to now.

The present inventors have successfully developed a new titanium dioxide powder fabrication method. In the method, it is possible to prepare titanium dioxide powder with good characteristics such as particle shape, particle size and distribution of the particle size, reproducibly and continuously. In addition, it is easy to control the mixture ratio of rutile and anatase phase of the titanium dioxide crystalline.

SUMMARY OF THE INVENTION

The object of the present invention is to provide a method for production of mono-dispersed and crystalline titanium dioxide ultrafine powders, in which it is possible to prepare titanium dioxide powder with good characteristics such as particle shape, particle size and distribution of the particle size, reproducibly and continuously not requiring an additional treatment, and in which it is also easy to control the mixture ratio of rutile and anatase phase of the titanium dioxide crystalline.

DETAILED DESCRIPTION OF THE INVENTION

In the present invention, mono-dispersed and crystalline titanium dioxide ultrafine powders are prepared by spontaneous precipitation using a stable transparent titanyl chloride solution that is prepared from titanium tetrachloride as a starting material.

The present invention provides a method for production of mono-dispersed and crystalline titanium dioxide ultrafine powders comprising the steps of: (a) preparing aqueous titanyl chloride ($TiOCl_2$) solution in a concentration of greater than or equal to 1.5M, by adding ice pieces of distilled water or icy distilled water to the undiluted titanium tetrachloride; (b) diluting the above aqueous titanyl chloride solution to a specific concentration by adding an adequate amount of distilled water; (c) obtaining titanium dioxide precipitates by heating the above diluted aqueous titanyl chloride solution and maintaining the temperature within the range of 15–155° C.; and (d) fabricating the mono-dispersed and crystalline titanium dioxide ultrafine powders by filtrating, washing and drying the above titanium dioxide precipitates.

In detail, the present invention provides a method for production of mono-dispersed and crystalline titanium dioxide ultrafine powders comprising the steps of: (a) preparing aqueous titanyl chloride solution in a concentration of greater than or equal to 1.5M, by adding ice pieces of distilled water or icy distilled water to the undiluted titanium tetrachloride; (b) diluting the above aqueous titanyl chloride solution to a specific concentration with an adequate amount of distilled water; (c) obtaining titanium dioxide precipitates by heating the above diluted aqueous titanyl chloride solution and maintaining the temperature within the range of 75–155° C. for 20 minutes to 3 hours; and (d) fabricating the mono-dispersed and crystalline titanium dioxide ultrafine powders by filtrating, washing and drying the above titanium dioxide precipitates.

The present invention also provides a method for the production of mono-dispersed and crystalline titanium dioxide ultrafine powders comprising the steps of: (a) preparing aqueous titanyl chloride solution in a concentration of greater than or equal to 1.5M, by adding ice pieces of distilled water or icy distilled water to the undiluted titanium tetrachloride; (b) diluting the above aqueous titanyl chloride solution to a specific concentration with an adequate amount of distilled water; (c) obtaining titanium dioxide precipitates by heating the above diluted aqueous titanyl chloride solution and maintaining the temperature within the range of 15–70° C. for 2 to 60 hours; and (d) fabricating the mono-dispersed and crystalline titanium dioxide ultrafine powders by filtrating, washing and drying the above titanium dioxide precipitates.

In (b) step of the above methods, the concentration of the prepared titanyl chloride is preferable at 0.2 to 1.2M.

The precipitation reaction of (c) step of the above methods can be carried out by adding ethanol higher than or equal to 1 volume % after (b) step. And the added ethanol can be evaporated completely during (c) step.

In addition, between (c) step and (d) step, a pressure of higher than 4 bar can be applied to the precipitates for 48 hours or more.

The present invention is characterized by the mono-dispersed and crystalline titanium dioxide ultrafine powders that can be obtained by spontaneous hydrolysis and crystallization occurring simultaneously at 80 to 95% of yield.

Titanium tetrachloride used in the present invention is really difficult to quantify since it has high vapor pressure at room temperature and tends to vigorously react with moisture in the air, and it is also difficult to know whether the form in aqueous solution state is titanium tetrachloride or titanyl chloride. Therefore, a stable aqueous solution with constant titanium ion concentration which is prepared by diluting unstable titanium tetrachloride-undiluted solution is required firstly to carry out precipitation reactions quantitatively and to inhibit the reaction of titanium chloride with the moisture in the air.

For the reason, in (a) step of the present invention, transparent and stable titanyl chloride solution with a titanium ion concentration higher than 1.5M is prepared by adding ice pieces of distilled water or icy distilled water to the undiluted titanium tetrachloride of high purity via a yellow and unstable intermediate solid, and the prepared titanyl chloride solution is kept at room temperature to use as a starting material of the precipitation reaction. If titanium tetrachloride is used with a volume ratio to prepare the starting stock solution, the vapor pressure increases during the preparation of the titanyl chloride solution, with titanium ion concentration higher than 1.5M. Thus, the loss of a titanium tetrachloride increases and the reproducibility of the reaction falls off. This result makes it difficult to control the amount of reactant and predict the productive efficiency of the final product. Therefore, in the present invention, a stable titanyl chloride solution is firstly prepared by adding a lesser amount of water than the quantitative amount to the titanium tetrachloride and an accurate concentration of the starting material can be given by determining the titanium ion concentration of the prepared solution. This makes it easy to predict the productive efficiency of the final product and keep the reproducibility of this invention.

If titanium tetrachloride is added to the water instead of adding water to titanium tetrachloride to prepare titanyl chloride solution, vigorous hydrolysis occurs as follows.

Scheme I

As shown in the above Scheme I, Ti(OH)$_4$, insoluble hydroxide is formed and the resultant is a suspension of strong hydrochloric acid containing both aqueous titanic acid solution and hydroxide. Although titanium dioxide precipitates are formed in this suspension by continuous hydrolysis, the formed titanium dioxide precipitates are amorphous or have weak crystallinity leading to low productivity even if using a starting material with a very low titanium ion concentration.

In addition, in the present invention, only the titanyl chloride solution prepared by adding the water to titanium tetrachloride is used for the precipitation reaction. When adding the water to the titanium tetrachloride, it is important not to cause the reaction slowly but to add a lesser amount of water to the titanium tetrachloride than the stoichiometric amount. Even if hydrolysis takes place during the reaction, it is not hydrolysis in apparent reaction, therefore the titanyl chloride solution prepared in the present invention does not contain insoluble hydroxide and has transparent characteristics from the beginning. Titanyl chloride, prepared by the following scheme II, is still more stable in the water than titanium tetrachloride and can be kept as in stable stock solution state at room temperature through stabilizing after the preparation reaction and adjusting concentration of this solution to higher than 1.5M.

Scheme II

The solution also remains stable and transparent even though a large amount of water is added within a short time as long as the concentration of the solution is adjusted to higher than 1.5M. That is, the hydrolysis producing Ti(OH)$_4$ does not occur even if hydrolysis does occur by adding water.

In (b) step of the present invention, the above titanyl chloride solution in a concentration of higher than 1.5M is diluted in a titanyl chloride solution with a concentration of 0.2 to 1.2M by adding water, which is used as a starting material. This diluted solution is sensitive to form precipitates and gives high productive efficiency of the final product. Additionally, the diluted solution prevent the loss of titanium ion, which is resulted from the increase of vapor pressure during the reaction, so the productive efficiency of final product can be determined by theoretic volume ratio.

However, if the concentration of the titanyl chloride solution is higher than 1.2M, even during the diluting process of the present invention, crystalline precipitates do not form homogeneously even after 10 days at temperatures lower than 100° C. Moreover, if the concentration of the titanyl chloride solution is lower than 0.2M, the nucleus of the titanium dioxide precipitates are formed in a large amount but the growth of the nucleus does not occur at the same time, thus the size of the formed titanium dioxide particles is lower than 0.05 μm and the yield of the final product is lower than 30 volume % by usual filtration using filter paper and centrifugation.

In (c) step of the present invention, the titanyl chloride solution is heated and maintained at a certain temperature for precipitation reaction. It takes some degree of time to precipitate, which means that activation energy is required for the precipitation reaction. In the reaction, water is added to provide the hydroxide ion and the reaction system is heated so as to jump over the activation energy barrier, then crystallization, as shown in Scheme IV, occurred at the same time as the hydrolysis shown in Scheme III, leading to the formation of titanium dioxide precipitates with increasing acidity.

Scheme III

Scheme IV

Since stirring during the precipitation reaction of (c) step makes the shape of the titanium dioxide particles somewhat irregular, and is not suitable for obtaining mono-dispersed titanium dioxide particles, stirring is done until the precipitation reaction begins and stirring is stopped when precipitation is induced. A reaction vessel with a lid is used in the present invention not to control the inner pressure but to inhibit the evaporation of materials such as water and ethanol which begins to evaporate at 60° C. and to complete the precipitation reaction at 90° C. or more within 1 hour. In addition, mono-dispersed titanium dioxide powders is formed at more than 155° C. similar to that at the lower temperature. It is desirable that the precipitation reaction is carried out at temperatures lower than 155° C. since additive equipment particularly designed for safety, is required to increase the water vapor pressure over 5 bar during the reaction.

In particular, the physical properties of titanium dioxide powders are controlled by changing the reaction temperature, the reaction time, the amount of added ethanol or the state of the reaction vessel, in the present invention. Firstly, the reaction temperature of the present invention is controlled within 15 to 155° C. The complete rutile phase of titanium dioxide ultrafine precipitates are obtained when the precipitation reaction is carried out at temperatures within 15 to 70° C., preferably 15 to 65° C. and the anatase phase is increased when the precipitation reaction is carried out as the temperature increases within the range of 70 to 155° C., thus the anatase phase is increased to about 45 volume % at 155° C. Secondly, with a precipitation reaction time longer than 1 hour at over 100° C. or the addition of ethanol before the precipitation reaction becomes over 1 volume %, the results are improved crystalline properties of rutile phase or an increased volume ratio of rutile phase to over 80 volume % or more. In addition, pressure over 4 bar for over 48 hours transforms the anatase phase, which is contained in the resultant precipitates, to a rutile phase completely, or it improves the crystalline properties of rutile phase which is originally contained in the resultant precipitation reaction. Thirdly, manipulating the opening of the equipment to control the evaporation amount of water or ethanol can result in a completely pure anatase phase of titanium dioxide crystalline of 100 volume %.

In addition, the size of mono-dispersed titanium dioxide particles can be controlled by changing the reaction temperature in the present invention. Mono-dispersed titanium dioxide ultrafine powders, which consists rutile and anatase phases having secondary particles with a size of 0.2 to 0.4 μm formed by uniform cohesion of primary particles with a size of about 10 nm, can be obtained regardless of the reaction temperature and reaction time, as long as the reaction is carried out within 70 to 155° C. On the other hand mono-dispersed titanium dioxide powders, which consist of only rutile phase having secondary particles with a size of 0.05 to 0.5 μm relative to the increase of the reaction temperature formed by uniform agglomeration of primary particles with a size of smaller than 10 nm, can be obtained if the precipitation reaction is carried out within the temperature range of 15 to 70° C., preferably 15 to 65° C. For mono-dispersed titanium dioxide ultrafine powders with a size of smaller than 0.1 μm, it is preferable that the precipitation reaction is carried out using a titanyl chloride solution properly-diluted at lower than 20° C. or using titanyl chloride solution with a low dilution concentration at higher than mid-range temperature for about 48 hours. Although a long time is required for the reaction, a continuous process makes it possible to produce titanium dioxide particles economically with relatively low energy consumption.

Titanium dioxide powders, which are fabricated by applying pressure higher than 4 bar to the precipitates obtained from the above (c) step, consists of only rutile phase having secondary particles with a size of 0.05 to 0.5 μm, relative to the increase of the reaction temperature, formed by uniform agglomeration of primary particles with a size of about 10 nm, similar to the above titanium dioxide powders of rutile phase. Therefore, crystalline titanium dioxide ultrafine powders with only rutile phase can be obtained with the following process, which can be developed to be a useful industrialized fabrication method; titanium dioxide precipitates of rutile phase, which are mixed with anatase phase, are firstly formed by the precipitation reaction at a temperature of higher than 70° C. in a short time and the formed titanium dioxide precipitates are changed to titanium dioxide particles with only rutile phase by applying pressure.

In (d) step of the present invention, titanium dioxide precipitates obtained in (c) step became final products through the post-treatment such as filtering, washing and drying. In the post-treatment, the precipitates are filtered using a usual filter paper of 0.1 μm pore size or a centrifuge to completely remove the strong acidic solution from the precipitates and washed with distilled water which is heated to over 40° C. In the conventional process, a pH-controlled buffer solution was used for complete washing of precipitates and preventing peptization during filtering, but in the present invention, distilled water which is heated to over 40° C. is used for washing acidic precipitates quickly to neutral state without peptization. If the washed precipitates are pulverized by ultrasonic waves, the fabricated titanium dioxide are composed of fine primary particles since the formed cohesive particles are dissolved to pass through the filter paper with 0.1 μm pore size. On the other hand, long-term washing with water causes the precipitates to bond with water and causes agglomeration, thus it is desirable to treat the washed precipitates by ethanol before drying to prevent agglomeration of the precipitates.

The ethanol-treated precipitates can be dried at temperatures higher than 50° C. for longer than 12 hours to obtain the final mono-dispersed titanium dioxide powders, but for complete removal of water and obtaining highly-pure crystalline titanium dioxide ultrafine powders, the precipitates should be dried at 150° C. for longer than 12 hours. Particularly, when the size of titanium dioxide powders needs to be controlled, according to the various uses of the product, such as the need for large size titanium dioxide powders. The size of titanium dioxide powders can be controlled by the following course; the dried titanium dioxide powders are calcined at temperatures higher than the drying temperature to reinforce the crystallinity of the particles and pulverized to a suitable size by ultrasonic waves.

The present invention is further illustrated with reference to the following examples that are not intended to be in any way limiting to the scope of the invention as claimed.

EXAMPLE 1

Fabrication of the Mono-Dispersed Titanium Dioxide Powders (1)

To prepare a stable aqueous titanyl chloride solution with a concentration of greater than or equal to 1.5M, an adequate amount of ice pieces of distilled water or icy distilled water was slowly added to the undiluted titanium tetrachloride, which had been cooled below 0° C., to cool the reaction heat generated by the reaction of titanium tetrachloride with water, and the solution was then stirred.

The above titanyl chloride solution was diluted with an adequate amount of distilled water to a concentration of 0.7M and stirred slowly. Then, the diluted solution was put into a teflon container with a lid, moved to a oven with constant temperature of 130° C. and was kept untouched for 0.5 hour for direct precipitation reaction. The obtained titanium dioxide precipitates were filtered using a usual filter paper with a porosity of 0.1 μm to completely remove the strong acidic solution from the precipitates, then washed with a distilled water of higher than 40° C. to be neutral state and finally, washed with ethanol.

The crystalline titanium dioxide precipitates were dried in a drier at 150° C. for 12 hours and resulted in mono-dispersed and crystalline titanium dioxide ultrafine powders which consist of rutile phase and anatase phase by the volume ratio of about 50:50.

Figure 1:
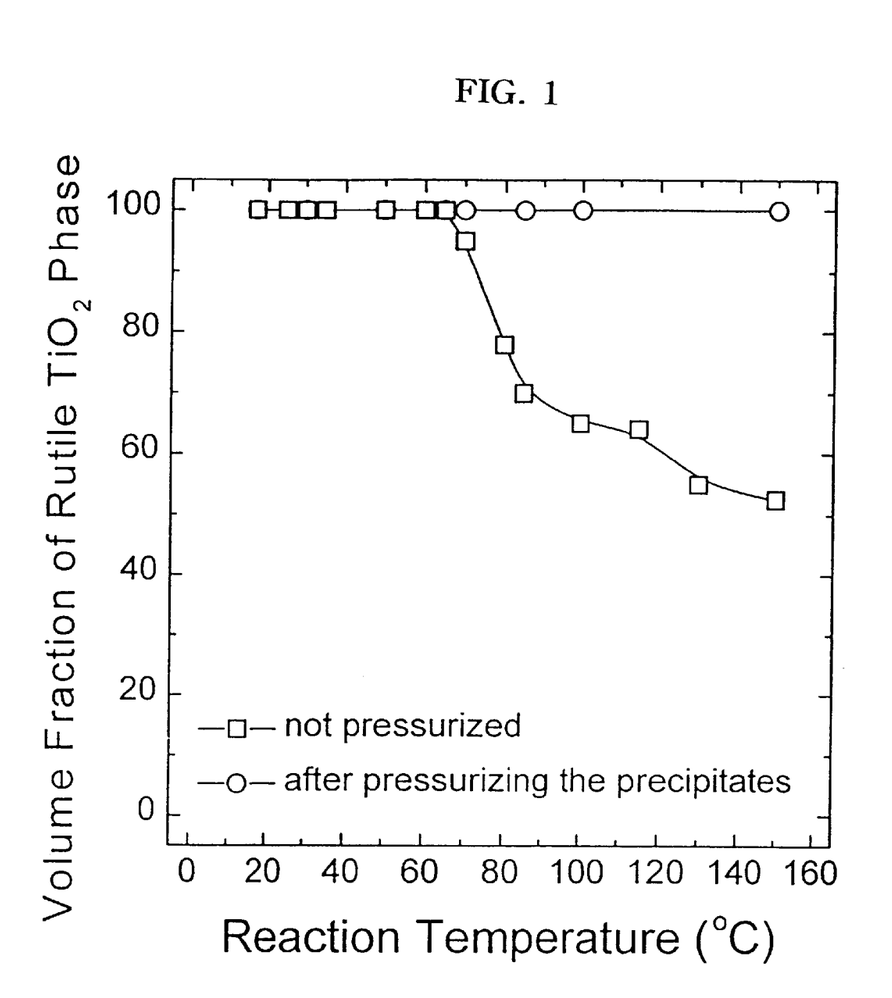
FIG. 1 is a graph showing the volume ratio of rutile phase for mono-dispersed and crystalline titanium dioxide ultrafine powders with the precipitation reaction temperature, which is calculated from the ratio of peak intensity of X-ray diffraction of rutile phase and anatase phase of the precipitates prepared from titanyl chloride solution with a titanium ion concentration of 0.47M at various reaction temperatures.
Figure 2:
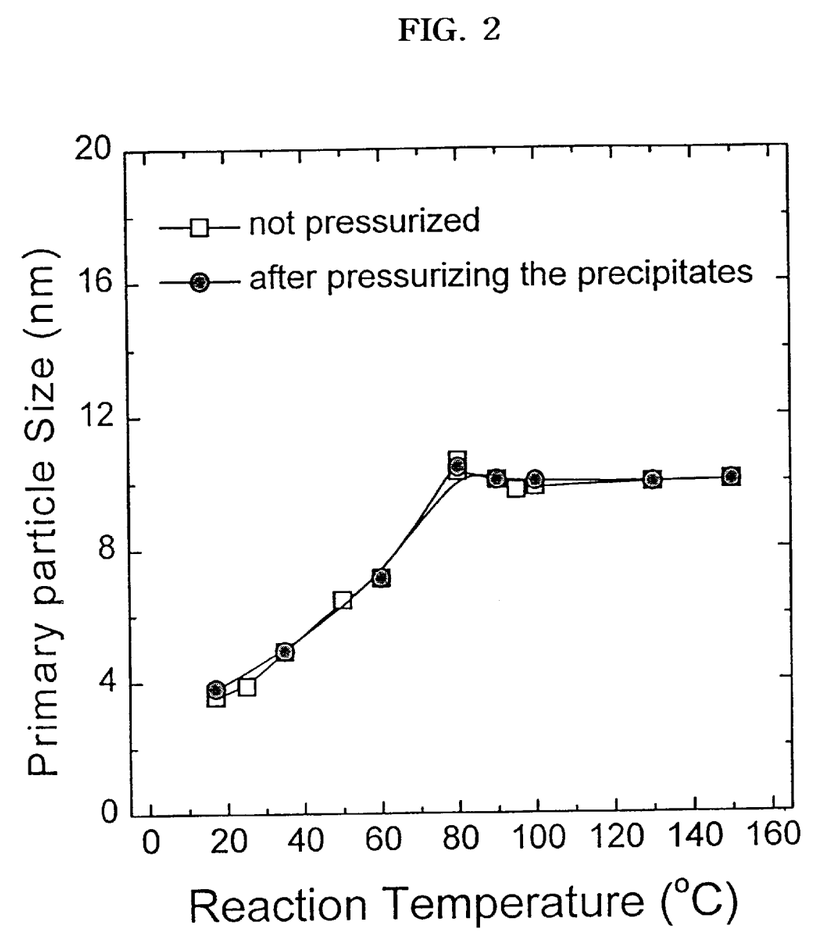
FIG. 2 is a graph showing the primary particle size at various precipitation reaction temperatures, which resulted from the X-ray diffraction patterns for mono-dispersed and crystalline titanium dioxide ultrafine powders.
Figure 3:
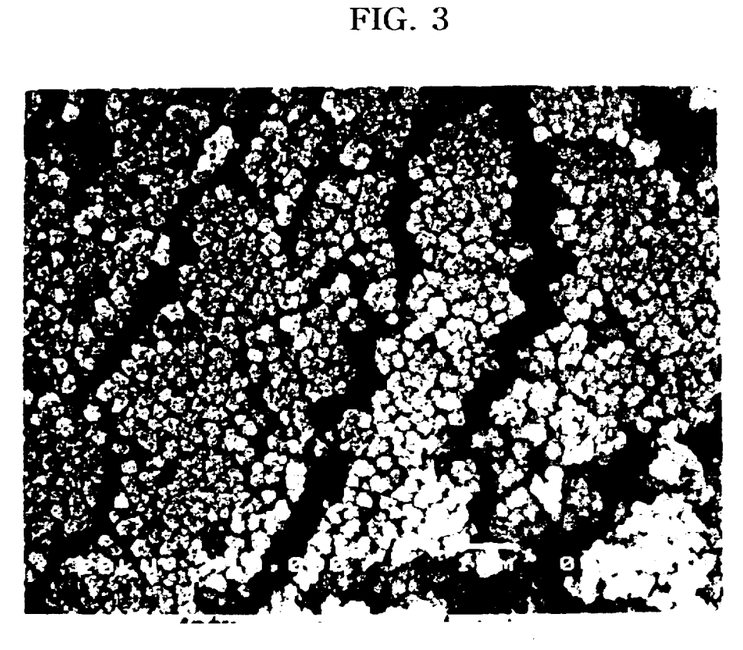
FIG. 3 is a SEM micrograph of mono-dispersed and crystalline titanium dioxide ultrafine powder with a mixture of rutile and anatase phases which are precipitated at 130° C. (×10,000).

The examination of the shapes of the above mono-dispersed titanium dioxide ultrafine powders by SEM showed that the size of the mono-dispersed titanium dioxide powders were in the range of 0.2 to 0.4 μm (mean particle size 0.3 μm) formed by homogeneous agglomeration and the powders consisted of primary particles with a size of about 10 nm (FIG. 3). In addition, the specific surface area of the mono-dispersed titanium dioxide powders was 150–200 $m^2/g$ and the yield was 95% or more.

EXAMPLE 2

Fabrication of the Mono-Dispersed Titanium Dioxide Powders (2)

Firstly, the diluted titanyl chloride solution with a concentration of 1.0M was prepared using the same procedure as in example 1. Mono-dispersed titanium dioxide powders with a mixture of 65 volume % rutile phase and 35 volume % anatase phase were obtained using the same procedure as in example 1 except that the reaction container was kept in a bath with a constant temperature of 100° C. and was untouched for 1 hour for direct precipitation reaction. In addition, mono-dispersed titanium dioxide powders with pure (100 volume %) rutile phase were obtained through filtering, washing and drying when the reaction time was 90 minutes or ethanol of greater than 10 volume 90 was added to the prepared titanyl chloride solution before the precipitation reaction. On the other hand, mono-dispersed titanium dioxide powders with pure (100 volume %) anatase phase were obtained when ethanol greater than 30 volume % was added and completely evaporated during the precipitation reaction.

The size of the mono-dispersed titanium dioxide powders were in the range of 0.2 to 0.4 μm (mean particle size 0.3 μm) and the powders consist of primary particles with a size of about 10 nm. In addition, the specific surface areas of the mono-dispersed titanium dioxide powders were 150–200 $m^2/g$ and the yield was 95% or more.

EXAMPLE 3

Fabrication of the Mono-Dispersed Titanium Dioxide Powders (3)

Firstly, the diluted titanyl chloride solution with a concentration of 0.47M was prepared using the same procedure as in example 1. Mono-dispersed titanium dioxide powders with a mixture of 70 volume % rutile phase and 30 volume % anatase phase were obtained using the same procedure as in example 1 except that the reaction container was kept in a bath with a constant temperature of 80° C. and was untouched for 3 hours for direct precipitation reaction. In addition, mono-dispersed titanium dioxide powders with pure rutile phase were obtained through filtering, washing and drying when ethanol of greater than 10 volume % was added to the prepared titanyl chloride solution before the precipitation reaction. On the other hand, mono-dispersed titanium dioxide powders with pure (100 volume %) anatase phase were obtained when ethanol of greater than 30 volume % was added and completely evaporated during the precipitation reaction.

The size of the mono-dispersed titanium dioxide powders was in the range of 0.2 to 0.4 $\mu$m (mean particle size 0.3 $\mu$m) and the powders consist of primary particles with a size of 10 nm. In addition, the specific surface area of the mono-dispersed titanium dioxide powders was 150–200 $m^2/g$ and the yield was 95% or more.

EXAMPLE 4

Fabrication of the Mono-Dispersed Titanium Dioxide Powders (4)

Figure 4:
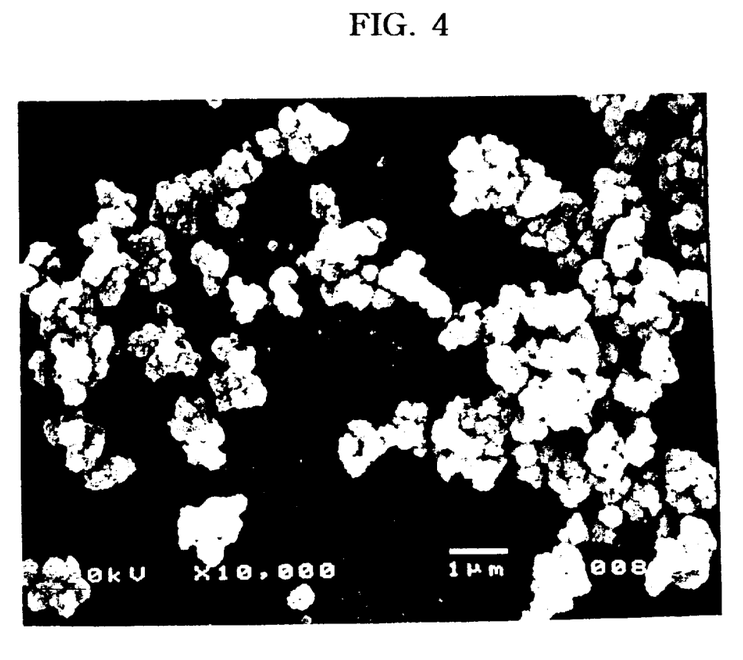
FIG. 4 is a SEM micrograph of mono-dispersed and crystalline titanium dioxide ultrafine powders with rutile phase which is transformed from the precipitates with the mixture of rutile and anatase phases formed at 100° C. by a pressure of 5 bar (×10,000).

Firstly, the diluted titanyl chloride solution with a concentration of 0.85M was prepared using the same procedure as in example 1. Mono-dispersed titanium dioxide powders were obtained using the same procedure as in example 1 except that the pressure of 5 bar for 48 hours was applied to the titanium dioxide precipitates which were resulted from the precipitation reaction carried out at 100° C. for 1 hour. The obtained mono-dispersed titanium dioxide powders were pure (100 volume %) rutile phase and consisted of primary particles with a size of 10 nm. The examination by SEM showed that the size of the mono-dispersed titanium dioxide powders was in the range of 0.3 to 0.5 $\mu$m (mean particle size 0.4 $\mu$m) (FIG. 4). In addition, the specific surface area of the mono-dispersed titanium dioxide powders was 150–200 $m^2/g$ and the yield was 95% or more.

EXAMPLE 5

Fabrication of the Mono-Dispersed Titanium Dioxide Powders (5)

Figure 5:
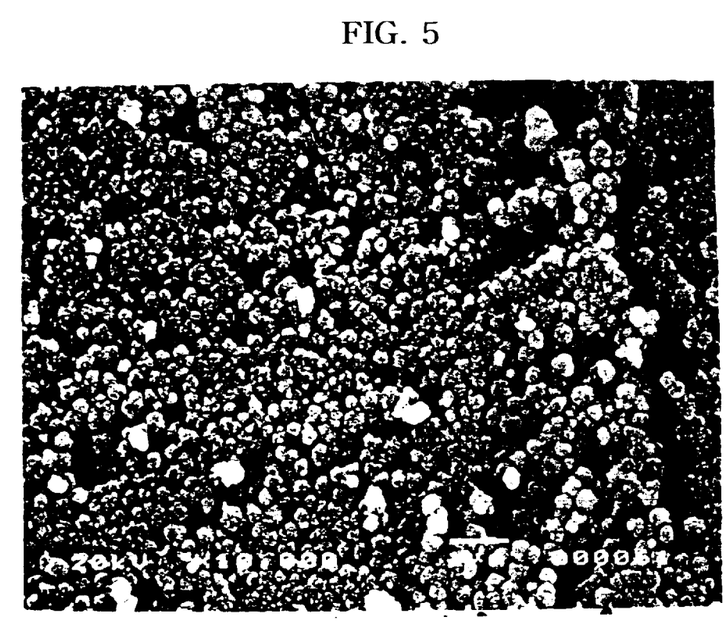
FIG. 5 is a SEM micrograph of mono-dispersed and crystalline titanium dioxide ultrafine powders with rutile phase which is precipitated at 60° C. (×10,000).

Firstly, the diluted titanyl chloride solution with a concentration of 0.67M was prepared using the same procedure as in example 1. Mono-dispersed titanium dioxide powders with rutile phase were obtained using the same procedure as in example 1 except that the reaction container was kept in a bath with a constant temperature of 60° C. and was untouched for 4 hours for a direct precipitation reaction. The obtained mono-dispersed titanium dioxide powders consist of 6 nm primary particles. The examination by SEM showed that the size of the mono-dispersed titanium dioxide powders was in the range of 0.1 to 0.4 $\mu$m (mean particle size 0.25 $\mu$m) (FIG. 5). In addition, the specific surface area of the mono-dispersed titanium dioxide powders was 150–200 $m^2/g$ and the yield was 90% or more.

EXAMPLE 6

Fabrication of the Mono-Dispersed Titanium Dioxide Powders (6)

Figure 6:
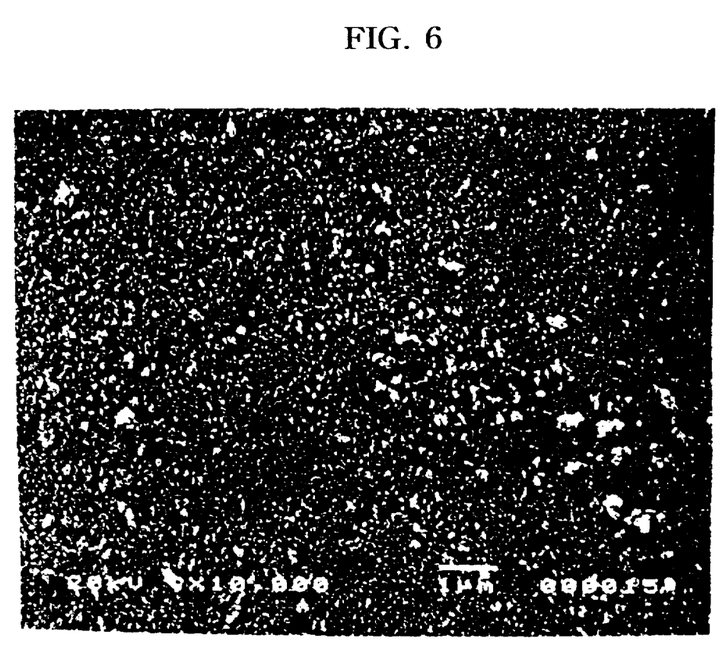
FIG. 6 is a SEM micrograph of mono-dispersed and crystalline titanium dioxide ultrafine powders with rutile phase which is precipitated at 17° C. (×10,000).

Firstly, the diluted titanyl chloride solution with a concentration of 0.4M was prepared using the same procedure as in example 1. Mono-dispersed titanium dioxide powders with rutile phase were obtained using the same procedure as in example 1 except that the titanium dioxide precipitates, which were resulted from the precipitation reaction carried out at 17° C. for 48 hours, were washed by centrifugation. The obtained mono-dispersed titanium dioxide powders consist of primary particles with a size of 3.5 nm. The examination by SEM showed that the size of the mono-dispersed titanium dioxide powders was in the range of 0.05 to 0.08 $\mu$m (mean particle size 0.25 $\mu$m) (FIG. 6). In addition, the specific surface area of the mono-dispersed titanium dioxide powders was about 200 $m^2/g$ and the yield was 95% or more.

EXAMPLE 7

Fabrication of the Mono-Dispersed Titanium Dioxide Powders (7)

Firstly, the diluted titanyl chloride solution with a concentration of 0.2M was prepared using the same procedure as in example 1. Mono-dispersed titanium dioxide powders with rutile phase were obtained using the same procedure as in example 1 except that the titanium dioxide precipitates, which was resulted from the precipitation reaction carried out at 65° C. for 48 hours, were washed by centrifugation.

The obtained mono-dispersed titanium dioxide powders consist of primary particles with a size of 7.5 nm. The examination by SEM showed that the shape of the mono-dispersed titanium dioxide powders was the same as FIG. 6 and the size was in the range of 0.05 to 0.08 $\mu$m (mean particle size 0.25 $\mu$m). In addition, the specific surface area of the mono-dispersed titanium dioxide powders was about 185 $m^2/g$ and the yield was 87% or more.

As a result of the precipitation reactions in various conditions including the condition of the above examples, it was confirmed that the temperature of the precipitation reaction should be lower than 30° C. or the concentration of the titanyl chloride solution should be less than 0.4M to obtain mono-dispersed and crystalline titanium dioxide ultrafine powders with a size smaller than 0.1 $\mu$m. On the other hand, it was also confirmed that the temperatures of the precipitation reaction should be higher than 30° C. or the concentration of the titanyl chloride solution should be greater than 0.4M to obtain mono-dispersed and crystalline titanium dioxide ultrafine powders with a size of 0.1 to 0.5 $\mu$m.

THE EFFECT OF THE INVENTION

As described distinctly in the above, mono-dispersed and crystalline titanium dioxide ultrafine powders can be prepared by the method of the present invention using stable and transparent titanyl chloride solution, which is prepared from titanium tetrachloride, as a starting material without precipitating of white amorphous titanium hydroxide, which is liable to be formed thermodynamically. Further, long-term growing-up or additive post-heating treatment is not required because titanium dioxide is crystallized directly from the spontaneous precipitation reaction, which makes it possible to simplify the preparing process and to put it to practical use with lower production costs. In addition, the mixture ratio of rutile and anatase phase and the particle size of the titanium dioxide crystalline are reproducibly controlled by changing the amount of added ethanol, the precipitation temperature, the precipitation time or the pressure applied to the precipitates, in the preparation process of the present invention.

What is claimed is:

1. A method for production of mono-dispersed and crystalline titanium dioxide ($TiO_2$) ultrafine powders comprising the steps of:

(a) preparing an aqueous titanyl chloride ($TiOCl_2$) solution in a concentration of greater than or equal to 1.5M, by adding ice pieces of distilled water or icy distilled water to the undiluted titanium tetrachloride ($TiCl_4$);

(b) diluting the above aqueous titanyl chloride solution to a specific concentration within the range of 0.2 to 1.2M by adding an adequate amount of distilled water;

(c) obtaining crystalline titanium dioxide, which precipitates, by heating the above diluted aqueous titanyl chloride solution and maintaining the temperature within a range of 15–155° C.; and (d) fabricating the mono-dispersed and crystalline titanium dioxide ultrafine powders by filtrating, washing and drying the above titanium dioxide precipitates.

2. The method for production of mono-dispersed and crystalline titanium dioxide ultrafine powders according to claim 1, wherein the precipitation reaction of (c) step is carried out with the addition of ethanol of higher than or equal to 1 volume % after (b) step.

3. The method for production of mono-dispersed and crystalline titanium dioxide ultrafine powders according to claim 2, wherein the added ethanol is evaporated completely during (c) step.

4. The method for production of mono-dispersed and crystalline titanium dioxide ultrafine powders according to claim 1, wherein pressure of higher than 4 bar is applied to the titanium dioxide precipitates for 48 hours or more between (c) step and (d) step.

5. A method for production of mono-dispersed and crystalline titanium dioxide ultrafine powders comprising the steps of:

(a) preparing an aqueous titanyl chloride solution in a concentration of greater than or equal to 1.5M, by adding ice pieces of distilled water or icy distilled water to the undiluted titanium tetrachloride;

(b) diluting the above aqueous titanyl chloride solution to a specific concentration within the range of 0.2 to 1.2M with an adequate amount of distilled water;

(c) obtaining crystalline titanium dioxide, which precipitates, by heating the above diluted aqueous titanyl chloride solution and maintaining the temperature within a range of 75–155° C. for 20 minutes to 3 hours; and (d) fabricating the mono-dispersed and crystalline titanium dioxide ultrafine powders by filtrating, washing and drying the above titanium dioxide precipitates.

6. The method for production of mono-dispersed and crystalline titanium dioxide ultrafine powders according to claim 5, wherein the precipitation reaction of (c) step is carried out with the addition of ethanol of higher than or equal to 1 volume % after (b) step.

7. The method for production of mono-dispersed and crystalline titanium dioxide ultrafine powders according to claim 6, wherein the added ethanol is evaporated completely during (c) step.

8. The method for production of mono-dispersed and crystalline titanium dioxide ultrafine powders according to claim 5, wherein pressure of higher than 4 bar is applied to the titanium dioxide precipitates for 48 hours or more between (c) step and (d) step.

9. A method for production of mono-dispersed and crystalline titanium dioxide ultrafine powders comprising the steps of;

(a) preparing an aqueous titanyl chloride solution in a concentration of greater than or equal to 1.5M, by adding ice pieces of distilled water or icy distilled water to the undiluted titanium tetrachloride;

(b) diluting the above aqueous titanyl chloride solution to a specific concentration within the range of 0.2 to 1.2M with an adequate amount of distilled water;

(c) obtaining crystalline titanium dioxide, which precipitates, by heating the above diluted aqueous titanyl chloride solution and maintaining the temperature within a range of 15–70° C. for 2 to 60 hours; and (d) fabricating the mono-dispersed and crystalline titanium dioxide ultrafine powders by filtrating, washing and drying the above titanium dioxide precipitates.

10. The method for production of mono-dispersed and crystalline titanium dioxide ultrafine powders according to claim 9, wherein the precipitation reaction of (c) step is carried out with the addition of ethanol of higher than or equal to 1 volume % after (b) step.

11. The method for production of mono-dispersed and crystalline titanium dioxide ultrafine powders according to claim 10, wherein the added ethanol is evaporated completely during (c) step.

12. The method for production of mono-dispersed and crystalline titanium dioxide ultrafine powders according to claim 9, wherein pressure of higher than 4 bar is applied to the titanium dioxide precipitates for 48 hours or more between (c) step and (d) step.

* * * * *